US010965511B2

(12) United States Patent
Matthews

(10) Patent No.: US 10,965,511 B2
(45) Date of Patent: Mar. 30, 2021

(54) MULTI-PHY SYNCHRONIZED DIVERSITY RECEIVER

(71) Applicant: Landis+Gyr Innovations, Inc., Alpharetta, GA (US)

(72) Inventor: Justin Clifford Matthews, Arncliffe (AU)

(73) Assignee: Landis+Gyr Innovations, Inc., Alpharetta, GA (US)

(*) Notice: Subject to any disclaimer, the term of this patent is extended or adjusted under 35 U.S.C. 154(b) by 0 days.

(21) Appl. No.: 16/551,462

(22) Filed: Aug. 26, 2019

(65) Prior Publication Data
US 2021/0067389 A1  Mar. 4, 2021

(51) Int. Cl.
| *H04L 27/26* | (2006.01) |
| *H04L 27/10* | (2006.01) |
| *H04L 5/00* | (2006.01) |
| *H04L 1/00* | (2006.01) |
| *H04W 84/18* | (2009.01) |

(52) U.S. Cl.
CPC ........ *H04L 27/2613* (2013.01); *H04L 1/0026* (2013.01); *H04L 5/0007* (2013.01); *H04L 27/10* (2013.01); *H04W 84/18* (2013.01)

(58) Field of Classification Search
CPC .......................... H04L 27/2613; H04L 1/0026
USPC ....................................................... 370/329
See application file for complete search history.

(56) References Cited

U.S. PATENT DOCUMENTS

| 2015/0117227 | A1* | 4/2015 | Zhang | ................ H04L 27/2698 |
| | | | | 370/245 |
| 2016/0087766 | A1* | 3/2016 | Sun | ....................... H04W 72/04 |
| | | | | 370/329 |
| 2018/0048499 | A1 | 2/2018 | De Ruijter | |
| 2019/0268449 | A1* | 8/2019 | Zhang | ................ H04L 27/2602 |

FOREIGN PATENT DOCUMENTS

EP  2699040  2/2014

OTHER PUBLICATIONS

International Patent Application No. PCT/US2020/046087, International Search Report and Written Opinion, dated Nov. 18, 2020, 11 pages.

* cited by examiner

*Primary Examiner* — Peter G Solinsky
(74) *Attorney, Agent, or Firm* — Kilpatrick Townsend & Stockton LLP

(57) ABSTRACT

A system for determining a communication mode utilized by a transmitting node to transmit a data packet in a mesh network is provided. For example, a receiving node operates in a base communication mode to detect a pilot prefix of a data packet. The pilot prefix contains a signal with a predetermined frequency. In response to determining that the pilot prefix is detected, the receiving node detects a communication mode used to transmit the data packet based on preamble signals that are contained in a preamble of the data packet and are received after the detected pilot prefix. Once the communication mode is detected, the receiving node receives and processes the remaining portion of the data packet using the detected communication mode.

20 Claims, 7 Drawing Sheets

MULTI-PHY SYNCHRONIZED DIVERSITY RECEIVER

TECHNICAL FIELD

This disclosure relates generally to communications between nodes in a network. More particularly, this disclosure relates to detecting or synchronizing to, by a diversity receiver that supports multiple physical (PHY) layer configurations in a network, a communication mode used by a transmitting node for transmitting a data packet.

BACKGROUND

In a network, infrastructure nodes (or simply "nodes"), such as meters, gateways, or routers, constantly communicate with each other to, for example, exchange messages or transmit data. Different nodes, however, may have different hardware and software configurations and thus may support different communication modes. In addition, each node may support multiple communication modes. For example, some nodes might be configured to support certain communication modes of orthogonal frequency-division multiplexing ("OFDM") while other nodes might be configured to support another set of OFDM communication modes. Some nodes might also be configured to support various communication modes based on frequency-shift keying ("FSK") in addition to OFDM. As such, when transmitting data, a transmitting node selects a communication mode among the multiple supported communication modes so that the data can be transmitted to the receiving node reliably and efficiently.

In order for the receiving node to correctly receive and decode the received data, the receiving node needs to identify the communication mode used for transmitting the data and to switch to the correct communication mode. One current mode switching mechanism relies on a mode switch header attached to a data packet to indicate the mode used by the transmitting node. Because the mode switch header is typically communicated in the base mode having a low data rate, transmitting the mode switch header can significantly reduce the efficiency of the transmission, especially for a communication mode that has a high data rate.

SUMMARY

Aspects and examples are disclosed for apparatuses and process for synchronizing and detecting, by a diversity receiver in a network, a communication mode used for transmitting a data packet. For instance, a system includes a transmitting node configured to generate and transmit a data packet to a receiving node using a communication mode selected from a plurality of supported communication modes. The data packet includes a pilot prefix generated to have a predetermined frequency, and a preamble and additional data generated using the selected communication mode. The system further includes a receiving node configured to operate in a base communication mode. The base communication mode is one of the plurality of supported communication modes. The receiving node is further configured to, while operating in the base communication mode, detect the pilot prefix. The receiving node is further configured to, in response to determining that the pilot prefix is detected, determine the communication mode used to transmit the data packet based on the preamble received after the detected pilot prefix. The receiving node is further configured to receive and process a remaining portion of the data packet using the detected communication mode.

In another example, a node of a network includes a processor configured to execute computer-readable instructions and a memory configured to store the computer-readable instructions that, when executed by the processor, cause the processor to perform operations. The operations include operating in a base communication mode that is one of the plurality of supported communication modes. The operations further include while operating in the base communication mode, detecting a pilot prefix of a data packet. The pilot prefix includes a signal with a predetermined frequency. The operations also include in response to determining that the pilot prefix is detected, determining a communication mode used to transmit the data packet based on preamble signals that are contained in a preamble of the data packet and received after the detected pilot prefix. The operations further include receiving and processing a remaining portion of the data packet using the detected communication mode.

In an additional example, a method includes operating, by a receiving node in a mesh network, in a base communication mode that is one of the plurality of supported communication modes and detecting, while operating in the base communication mode, a pilot prefix of a data packet that includes a signal with a predetermined frequency. The method also includes in response to determining that the pilot prefix is detected, determining, by the receiving node, a communication mode used to transmit the data packet based on preamble signals that are contained in a preamble of the data packet and received after the detected pilot prefix. The method further includes receiving and processing, by the receiving node, a remaining portion of the data packet using the detected communication mode.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
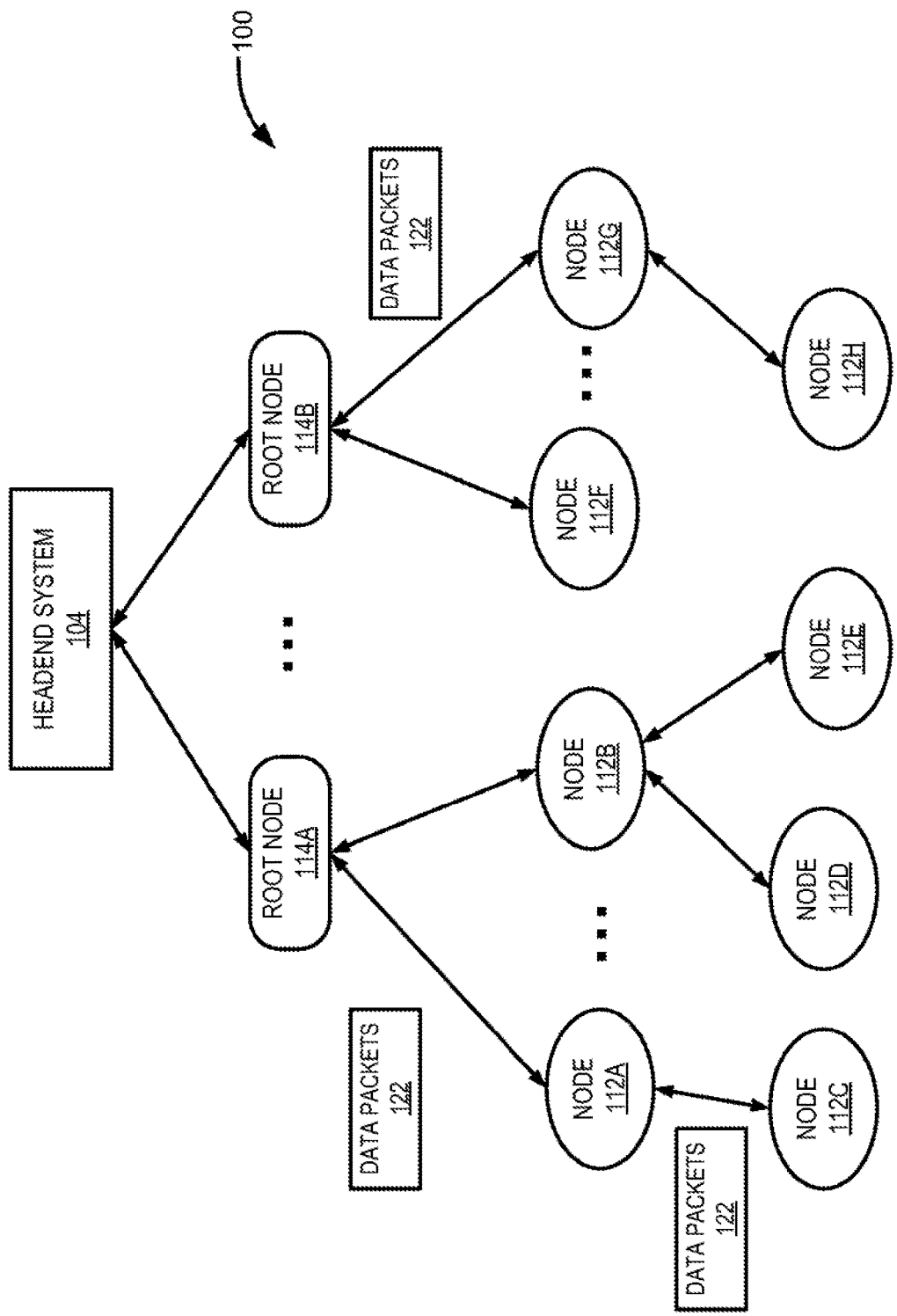
FIG. 1 is a block diagram showing an illustrative operating environment for detecting, by a receiving node, a communication mode utilized by a transmitting node to transmit a data packet in a network, according to certain examples of the disclosure.

Systems and methods are provided for transmitting data packets that allow a diversity receiver to synchronize and detect the communication mode used for the data packets in a mesh network. For example, a transmitting node selects a communication mode among a set of supported communication modes and generates a data packet using the selected communication mode. The data packet includes a pilot prefix containing a signal with a predetermined frequency, such as the carrier frequency used at the transmitting node. The pilot prefix can be utilized by the receiving node, i.e. a diversity receiver that support multiple physical layer configurations, to synchronize and detect the selected communication mode. The data packet further includes, following the pilot prefix, a preamble and additional data, such as the payload data. Both the preamble and the remaining data are generated using the selected communication mode. The transmitting node then transmits the data packet to the receiving node.

The receiving node, while not actively receiving and processing data packets, operates in a base communication mode to listen for the pilot prefix, such as a pilot prefix signal at the predetermined frequency or a base communication mode preamble. In some examples, the base communication mode is a mode in the set of supported communication modes that has the longest communication range. The receiving node detects the pilot prefix signal in the base mode by sampling and analyzing the signal received at the predetermined frequency. If the quality (e.g. the signal strength) of the received signal is good enough, such as higher than a predetermined threshold value of pilot prefix quality, the receiving node synchronizes with the received data packet by determining that a pilot prefix of a data packet is detected and more data will follow the pilot prefix.

In order to correctly decode the data following the pilot prefix, the receiving node further determines the communication mode selected by the transmitting node to generate the data packet. The communication mode detection is performed based on the received preamble signals in the preamble of the data packet. The receiving node cycles through the set of supported communication modes to find a mode that matches the transmission mode used to transmit the data packet. In some examples, the receiving nodes cycles through the set of supported communication modes based on the descending order of the data rates associated with these modes. In these examples, the receiving node first switches to a communication mode that has the highest data rate among the set of supported communication modes. The receiving node then determines the quality of the received preamble signals. If the quality is higher than a predetermined threshold value of preamble quality, the receiving node can determine the current communication mode is the mode used by the transmitting node. The receiving node then continues to receive and process the rest of the data packet using the determined mode.

If the quality of the received preamble signal is not higher than a predetermined threshold value of preamble quality, the receiving node switches to the next supported communication mode. For example, the receiving node can switch to a mode that has the highest data rate among the remaining unexamined communication modes. The receiving node repeats the above process to determine whether the currently examined mode is the selected mode used for transmitting the data packet. This process repeats until the communication mode is detected or all the modes have been examined. If the receiving node still cannot detect a communication mode after examining all the supported communication modes, the receiving node decides that it is not the intended receiver of the data packet and switches to the base mode to listen for more incoming traffic.

Techniques described in the present disclosure increases the efficiency of the communication between nodes of a network. As discussed above, the mode switch header used in existing approaches may take a longer time to transmit than the payload because of the low data rate of the base mode used to communicate the mode switch header. The pilot prefix detection and mode detection described in the present disclosure, on the other hand, can be performed by the receiving node within a fraction of the time duration used to receive and process the mode switch header. As a result, the transmission efficiency (e.g. the ratio between the effective data rate and the payload data rate) can be significantly increased.

Furthermore, the mode switch mechanism described in the present disclosure allows receiving nodes to operate in a base mode having the longest range of communication. This enables the receiving nodes to communicate with transmitting nodes far away thereby maximizing the communication range of the nodes. Further, by operating in a base mode with a long range of communication, the bandwidth of the receiving node is also small, thereby increasing the immunity of the receiving node from external interferences. In addition, the pilot prefix containing a signal with a single frequency can be generated using minimal resources. As such, the computational complexity and the communication resource consumption at the transmitting node are also reduced.

FIG. 1 shows an illustrative network 100 in which transmitting nodes transmit data packets using selected communication modes to receiving nodes in the network and receiving nodes detect the selected communication modes based on the received data packets. The network 100 shown in FIG. 1 includes multiple nodes 112A-112H (which may be referred to herein individually as a node 112 or collectively as the nodes 112). The nodes 112 may include measuring nodes for collecting data from the respective deployed location of the nodes, processing nodes for processing data available to the nodes, router nodes for forwarding data received from one node to another node in the network 100, or nodes that are configured to perform a combination of these functions. The nodes 112 are further configured to communicate with each other so that messages or data can be exchanged between the nodes 112.

In one example, the network 100 can be associated with a resource distribution network, such as a utility network, to deliver measurement data obtained in the resource distribution network. In this example, the nodes 112 can include meters such as electricity meters, gas meters, water meters, steam meters, etc. and be implemented to measure various operating characteristics of the resource distribution network and to transmit the collected data through the network 100 to, for example, root nodes 114A and 114B (which may be referred to herein individually as a root node 114 or collectively as the root nodes 114).

Root nodes 114 of the network 100 may be configured for communicating with the nodes 112 to perform operations such as managing the nodes 112, collecting data from the nodes 112 and forwarding data to a headend system 104. A root node 114 can also be configured to function as a node to measure and process data itself. The root nodes 114 may be personal area network (PAN) coordinators, gateways, or any other devices capable of communicating with the headend system 104. The root nodes 114 ultimately transmit the generated and collected data to the headend system 104 via one or more additional networks (not shown in FIG. 1). The headend system 104 can function as a central processing system that receives streams of data or messages from the root node 114. The headend system 104 can process the collected data or have the collected data be processed for various applications.

In order for the nodes of the network 100 to communicate with each other, each node is configured to support one or more communication modes. For example, a node 112 may be configured to support FSK at various data rates. Another node may be configured to support both FSK and OFDM at different modulation and coding schemes (MCS) levels. Because different nodes of the network 100, including the nodes 112 and the root nodes 114, may be configured differently, their capabilities of supporting communication modes can be different. As such, each node in the network is configured with a common base mode of communication.

In some examples, the base mode is determined by the capabilities of the deployment. For example, a node deployment might contain some older, less capable nodes alongside newer, more capable nodes. In this case, the base mode for the network can be a mode that the older nodes can support, such as the FSK modulation. The newer OFDM capable nodes can use the FSK base mode for multicast messages and to initiate a mode switch operation. Further, in this deployment, a node can be assumed to have the minimum capabilities required to join the network and support the base node until positive confirmation from that node that it has enhanced capabilities is received. In one example, this information can be shared using an information element defined in the IEEE 802.15.4 standard. In further examples, the base mode of the nodes 112 is selected as a mode among the supported communication modes that has a longer range of communication than a majority of the supported communication modes, such as the mode with the longest range of communication.

In order for a pair of nodes to communicate with each other, the node that transmits data, also referred to herein as the "transmitting node," determines a communication mode so that data packets 122 can be successfully transmitted to the other node, also referred to herein as the "receiving node." According to some aspects of the disclosure, the selected communication mode also can be used by the receiving node to successfully transmit acknowledgment packets back to the transmitting node to confirm that it has received the data packets 122. In some examples, the receiving nodes are diversity receivers that each supports multiple physical layer configurations. In order to correctly receive and process the data packets 122, the receiving node detects the correct communication mode based on the signal contained in the received data packets 122 and switches to the detected communication mode to receive the remaining portion of the data packets 122. Additional details regarding the receiving node detecting and switching to the correct communication mode are described below with regard to FIGS. 2-6.

It should be appreciated that the communication mode detection mechanism described herein can be utilized by any nodes in the network 100, including the node 112, the root node 114, or any other nodes of the network 100 that are capable of communicating with other nodes of the network. In addition, while FIG. 1 depicts a specific network topology (e.g., a DODAG tree), other network topologies are also possible (e.g., a ring topology, a mesh topology, a star topology, etc.).

Figure 2:
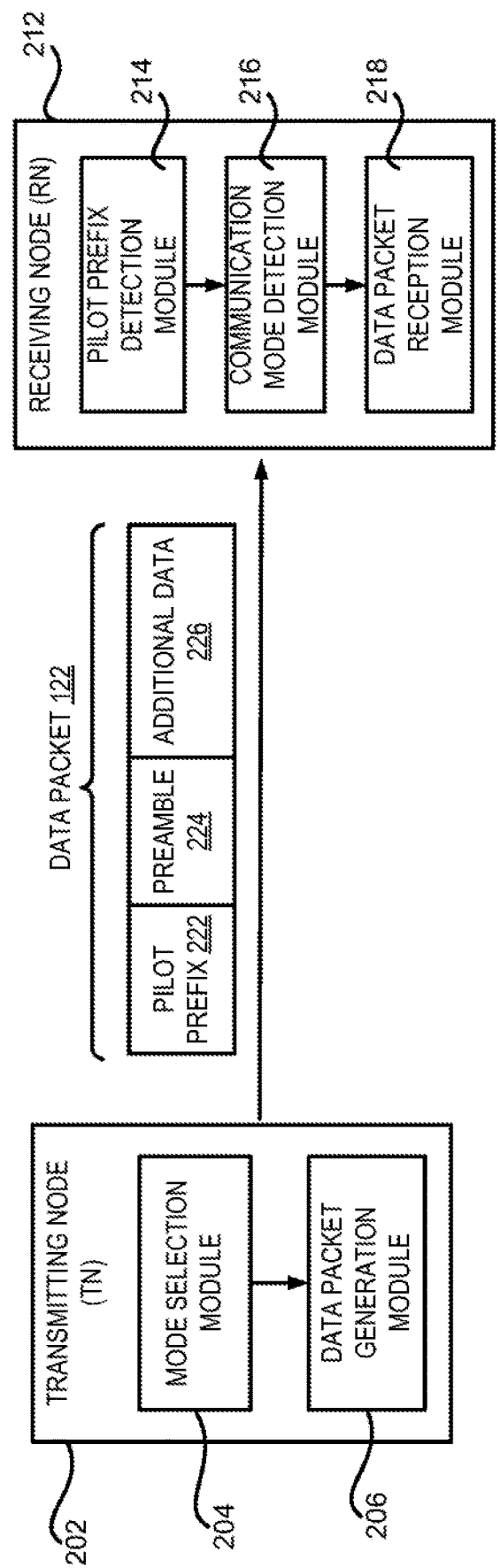
FIG. 2 is a diagram showing aspects of a transmitting node and a receiving node configured for transmitting data packets that allow the receiving node to synchronize and detect the selected communication mode used for the data packets, according to certain examples of the disclosure.

Referring now to FIG. 2, FIG. 2 illustrates aspects of a transmitting node and a receiving node configured for transmitting data packets that allow the receiving node to detect the selected communication mode used for the data packets, according to certain examples of the disclosure. The transmitting node 202 can be a node 112, a root node 114, or any other node of the network 100 that is capable of communicating with another node in the network. The receiving node 212 is a neighbor of the transmitting node 202, i.e. any node in the network 100 that the transmitting node 202 can directly communicate with.

The transmitting node 202 can include a mode selection module 204 configured to select a communication mode so that the transmitting node 202 can successfully complete communication with the receiving node 212 using the selected communication mode. In some examples, the transmitting node 202 determines the communication mode based on the communication conditions of the transmitting node 202 and the receiving node 212. The communication conditions can be described using various factors including, but not limited to, the transmission power used for transmitting the data packets 122, the path loss between the transmitting node 202 and the receiving node 212 (i.e. the power attenuation of the transmitted signal as it propagates through the communication path), the SNR requirement at the receiving node 212, the noise floor observed at the receiving node 212, and so on. One mechanism for selecting a communication mode for a transmitting node 202 and a receiving node 212 is described in U.S. patent application Ser. No. 16/285,309, which was filed on Feb. 26, 2019, and entitled "Mode Selection for Mesh Network Communication," and which is expressly incorporated herein by reference in its entirety.

It should be noted that some transmitting nodes might be configured to support a single communication mode. In those scenarios, the transmitting node does not need to implement the mode selection module and instead just uses the supported communication mode for communication.

The transmitting node 202 further includes a data packet generation module 206 configured to generate data packets 122 using the selected communication mode for communication with the receiving node 212. A data packet 122 generated by the data packet generation module 206 can include a preamble 224 and additional data 226. The preamble 224 contains preamble signals that can be utilized by the receiving node 212 for purposes such as synchronization. Additional data 226 can include data such as data packet delimiter, physical layer header describing the length of the data unit, payload data, or any other data need to be transmitted to the receiving node 212. In one example, the data packet generation module 206 generates the preamble 224 and the additional data 226 of the data packets 122 by following the data packet format defined in the IEEE 802.15.4 standard. As a result, the data packet generated by the transmitting node 202 can be received by receiving nodes that follows the 802.15.4 standard. As can be seen from the follow description, the receiving node 212 that implements the technology presented herein is also capable of receiving standard 802.15.4 signals.

To facilitate the receiving node's 212 determination of the communication mode utilized by the transmitting node 202, the data packet generation module 206 further generates a pilot prefix 222 for each data packet 122. In some examples, the pilot prefix 222 contains a signal with a predetermined frequency, such as the carrier frequency of the transmitting node 202 which is the middle frequency of the channel used by the transmitting node 202. The pilot prefix 222 can thus be generated as the carrier wave used by the transmitting node 202 that is unmodulated with an information signal or a base mode preamble. In some examples, the pilot prefix is further generated to have a predetermined amplitude and a predetermined length. The length of the pilot prefix 222 can be determined based on the amount of time generally needed by a receiving node 212 to detect the pilot prefix 222, which is determined based on various factors such as the hardware capabilities of the receiving nodes 212 in the network 100, the channel conditions between nodes in the networks 100, and so on.

Figure 3:
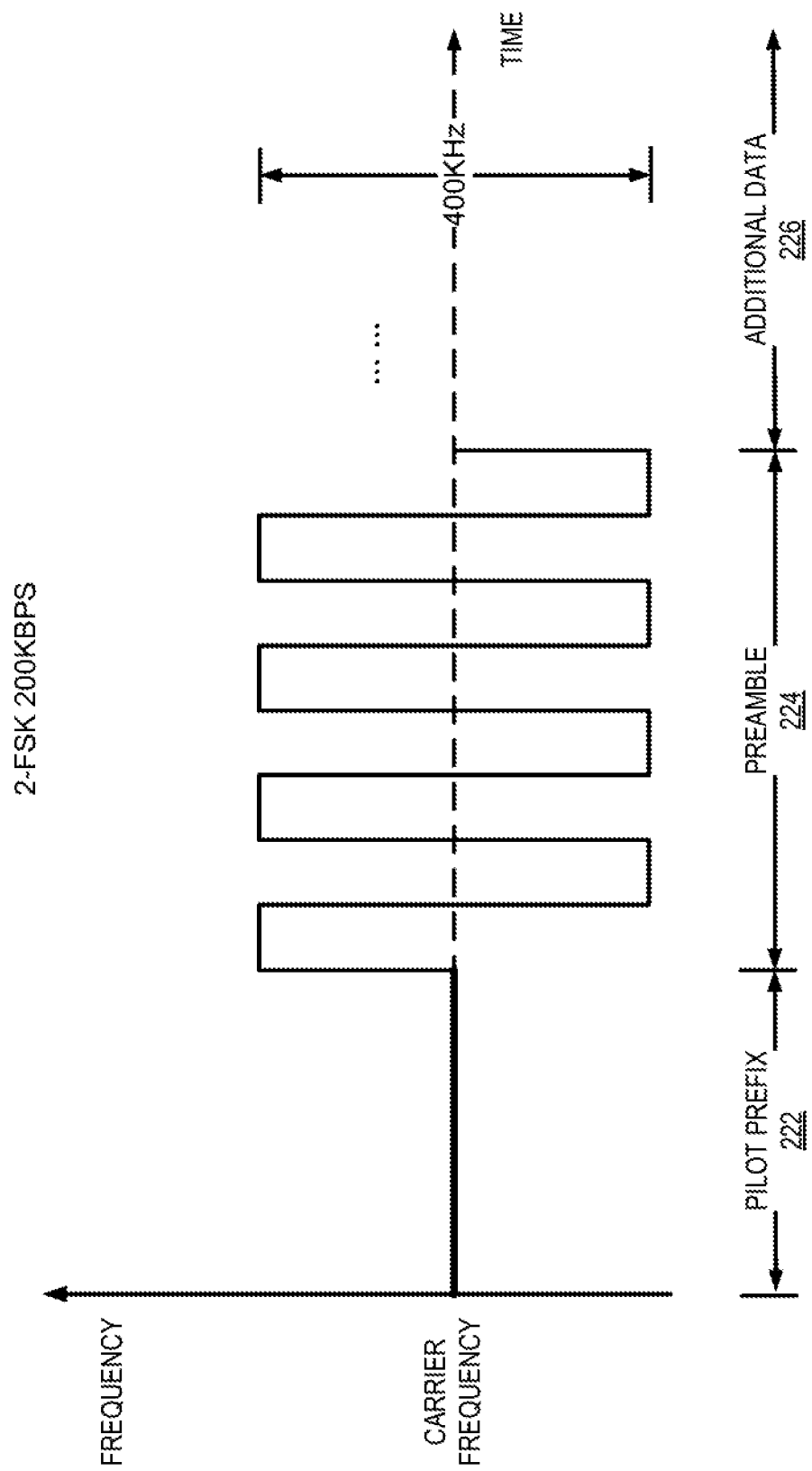
FIG. 3 is an example of a data packet transmitted by a transmitting node to a receiving node that allows the receiving node to detect the selected communication mode used for the data packet, according to certain examples of the disclosure.

As a result, a data packet 122 generated by the data packet generation module 206 includes the pilot prefix 222 followed by the preamble 224 and then by additional data 226. When transmitting the data packet 122, the transmitting node 202 first transmits the pilot prefix 222 and then transmits the preamble 224 followed by the additional data 226 in the data packet 122. FIG. 3 shows an example of a data packet 122 generated by a transmitting node 202 using the communication mode of 2-FSK 200 kbps. The vertical axis of FIG. 3 represents the frequency of the signals contained in the data packet and the horizontal axis represents the time. In the example shown in FIG. 3, the pilot prefix 222 has a constant frequency which lies at the carrier frequency of the transmitting node 202 in this example. The preamble 224 and additional data 226 are generated using the selected mode, 2-FSK 200 kbps, which has a bandwidth of 400 KHz. In this example, the preamble 224 contains alternating high- and low-frequency signals representing 0s and 1s.

Referring back to FIG. 2, the transmitting node 202 transmits the generated data packet 122 to the receiving node 212. As discussed above, the receiving node 212 operates in the base mode to listen for traffic in the network 100. More specifically, the receiving node 212 employs a pilot prefix detection module 214 to detect pilot prefix 222. In some examples, the detection of the pilot prefix is performed based on the sampled energy of the received signals. The receiving node 212 samples the received signal with a sampling rate determined by the hardware configurations and other configurations. In an example of a receiving node 212 having a 160 kHz sampling rate, the transceiver of the receiving node 212 can output one sample of the energy of the received signal every 6.25 microseconds.

Based on these sampled signal energy, the pilot prefix detection module 214 or another module of the receiving node 212 calculates an averaged sample energy over a set of samples, such as 16 samples. The averaged sample energy can then be utilized to calculate a signal strength indicator to estimate the power level at the receiving node 212, such as a received signal strength indicator (RSSI). The pilot prefix detection module 214 can utilize the calculated signal strength indicators to determine whether a pilot prefix is detected. For example, the pilot prefix detection module 214 can calculate an average signal strength indicator over multiple consecutive signal strength indicators, such as three to four, and compare the average signal strength indicator with a threshold value of pilot prefix strength. If the signal strength indicator is higher than the threshold value, then the pilot prefix detection module 214 determines that a pilot prefix is detected; otherwise, no pilot prefix is detected. Alternatively, or additionally, the pilot prefix detection module 214 can compare each signal strength indicator with the threshold value and perform a majority voting on multiple the signal strength indicator comparisons to determine if a pilot prefix is detected. As can be seen from the above, the higher the sampling rate of the receiving node 212, the faster the prefix pilot can be detected.

If the pilot prefix detection module 214 detects the pilot prefix in the received signal, the receiving node 212 may determine that there is an incoming data packet 122 and proceed to detect the correct communication mode used to transmit the data packet 122. In one example, the receiving node 212 employs a communication mode detection module 216 to detect the correct communication mode. In some implementations, the communication mode detection module 216 performs the detection by cycling through the set of supported communication modes based on the preamble 224 received following the pilot prefix 222.

In certain examples, the communication mode detection module 216 follows the descending order of data rates of the supported communication modes when cycling through these modes. In these examples, as the receiving node 212 receives the preamble signals of the data packet 122, the communication mode detection module 216 selects a first communication mode among the set of communication modes that are supported by the receiving node 212. The communication mode detection module 216 further switches to the selected communication mode and determines if the selected communication mode is the correct mode utilized by the transmitting node 202 to transmit the received preamble 224. In some examples, the communication mode detection module 216 selects the communication mode that has the highest data rate as the first mode to be examined.

The communication mode detection module 216 determines if the current mode is the correct mode by examining the quality of the received preamble 224. In some examples, the communication mode detection module 216 can examine the quality of the received preamble 224 under the currently evaluated communication mode by demodulating the received signal and correlating the demodulated signal to the expected preamble signal in the current mode.

The communication mode detection module 216 further compares the preamble quality value with a threshold value of preamble quality. If the preamble quality value is higher than the threshold value, then the communication mode detection module 216 determines that the current communication mode is the correct communication mode; otherwise, the communication mode detection module 216 selects the next supported communication mode for evaluation.

In some examples, the communication mode detection module 216 selects and switches to the next communication mode for evaluation by selecting a supported communication mode having the highest data rate among the unexamined communication modes. The communication mode detection module 216 repeats the above process for the newly selected mode. If the communication mode detection module 216 determines that the newly selected mode is also not the correct communication mode utilized by the transmitting node 202, the communication mode detection module 216 continues to a next supported communication mode that has the highest data rate among the remaining unexamined modes. The communication mode detection module 216 repeats the above process until the correct communication mode is detected. The receiving node 212 then utilizes a data packet reception module 218 to receive the remaining portion of the data packet 122, such as the remaining portion of the preamble 224 and additional data 226, using the detected communication mode. If, after cycling through all the supported communication modes, the communication mode detection module 216 still cannot detect the correct communication mode, the receiving node 212 may determine that the data packet 122 is not intended for the receiving node 212 and switch to the base mode to listen for other network traffic.

Table 1 shows an example of the supported communication modes of the receiving node 212. In this example, the receiving node 212 have six supported communication modes: F2B10 (i.e. 2-FSK 10 kbps mode), F2B20 (i.e. 2-FSK 20 kbps mode), F2B50 (i.e. 2-FSK 50 kbps mode), F2B100 (i.e. 2-FSK 100 kbps mode), F2B200 (i.e. 2-FSK 200 kbps mode), and O1Mx (i.e. SUN OFDM Option 1). Table 1 also lists the data rate and the bandwidth of each of the supported communication modes.

As discussed above, when determining the communication mode utilized by the transmitting node 202 to transmit the data packet 122, the communication mode detection module 216 examines the supported communication modes according to the descending order of the data rates of these modes. In the example shown in Table 1, these supported communication modes are examined in the following order, O1Mx, F2B200, F2B100, F2B50, F2B20, and F2B10. For each of these modes, Table 1 lists an example of the length of the time $T_{PQ}$ needed for determining the preamble quality and thus whether the particular mode is the correct communication mode.

For example, the communication mode detection module needs 120 μs to determine if the O1Mx mode is the correct mode and 40 μs to determine if F2B200 is the correct mode. As such, if the correct mode is F2B100, it will take the communication mode detection module 240 μs to detect that mode. This is because the communication mode detection module will first switch to O1Mx mode to determine if O1Mx is the correct mode, which takes 120 μs. The communication mode detection module will then switch to F2B200 to perform the detection, which takes 40 μs. After a total of 120+40=160 μs, the communication mode detection module starts to examine if F2B100 is the correct mode, which takes another 80 μs.

In the last column, Table 1 lists the wait time and the number of lapsed symbols for each supported communication mode if the corresponding mode is the correct communication mode. The number of lapsed symbols refers to the number of symbols in the correct communication mode that could have been received and processed in the time before the receiving node 212 switches to the correct mode. For example, if F2B50 is the correct communication mode, it will take the communication mode detection module 240 μs or the time corresponding to 12 symbols transmitted in the F2B50 mode before the communication mode detection module switches to F2B50 and starts to examine this mode. Because the O1Mx is the first mode to be examined, there is no wait time or lapsed symbols for this mode.

TABLE 1

| Order of examination | Mode | Data Rate | Rx BW | $T_{PQ}$ | Wait time/# of lapsed symbols |
|---|---|---|---|---|---|
| 6 | F2B10 | 10 kbps | 20 kHz | 800 μs | 800 μs/8 sym |
| 5 | F2B20 | 20 kbps | 40 kHz | 400 μs | 400 μs/8 sym |
| 4 | F2B50 | 50 kbps | 100 kHz | 160 μs | 240 μs/12 sym |
| 3 | F2B100 | 100 kbps | 200 kHz | 80 μs | 160 μs/16 sym |
| 2 | F2B200 | 200 kbps | 400 kHz | 40 μs | 120 μs/24 sym |
| 1 | O1Mx | >1 Mbps | 1200 kHz | 120 μs | 0 μs/0 sym |

As shown in the example Table 1, by examining the supported communication modes in the descending order of the respective data rates, the wait time and the number of lapsed symbols before switching to the correct communication mode are maintained at an acceptable level for each supported communication mode. This allows each of the supported communication modes to be examined within a reasonable number of preamble symbols.

For comparison purposes, consider the implementation where the communication mode detection module 216 examines the supported modes in the ascending order of the data rates. In this implementation, the communication modes having lower data rates can be detected within a reasonable number of preamble symbols, whereas the high data rate modes will be detected after a significant number of preamble symbols are received. For instance, if the correct communication mode is F2B200, it will take close to 300 symbols before the communication mode detection module 216 can start to examine the mode F2B200. This is because the receiving node 212 has to switch to the lower data rate modes including F2B10, F2B20, F2B50 and F2B100 before switching to the correct mode F2B200. While at these low data rate modes, the receiving node 212 operates at a lower data rate to detect the quality of the preamble despite the fact that the preambles are transmitted at a higher data rate of 200 kbps. As a result, during the time when those low data rate modes are examined, a large number of preamble symbols have been received.

Examining these modes in the descending order of their data rates, on the other hand, would not lead to such a large number of symbols to lapse before a correct mode is examined. This is because high data rate modes are examined first. If any of the high data rate modes is the correct mode, the high data rate mode is examined earlier in the process when a small number of preamble symbols are received. If the correct mode is a low data rate mode, during the time when high data rate modes are examined, there are not many symbols are received (due to the low data rate), and by the time when the correct low data rate mode is examined, only a small number of symbols (in the low data rate) have been received.

It should be noted that in the example shown in Table 1, reconfiguration time of the receiving node 212, i.e. the time spent on switching from one mode to another mode, is not added to the wait time. The duration of the reconfiguration time depends on the hardware capability of the receiving node 212 as well as the communication mode before and after the mode switch. For example, the reconfiguration time is shorter if the receiving node 212 switches from a high data rate mode to a low data rate mode than switching from the low rate mode to the high rate mode. In addition, during the process of measuring the preamble quality, other adjustments such as automatic gain control (AGC) may be implemented and may thus increase the wait time for each mode.

It should be further appreciated that while the above description focuses on generating a pilot prefix at the carrier frequency of the transmitting node 202, a frequency different from the carrier frequency can also be utilized by the transmitting node 202 to transmit the pilot prefix. If such a frequency is utilized, the transmitting node 202 and the receiving node 212 can be configured to adjust their center frequency to the selected frequency so that the pilot prefix can be detected by the receiving node 212. Again, by generating the pilot prefix at the selected single frequency, the detection of the pilot prefix can be performed with less internal and external interference at the receiving node 212.

It should also be appreciated that while the above description focuses on detecting the communication mode utilized by the transmitting node 202 based on the quality of the received preamble signals, other ways of detecting the correct communication mode can be implemented by the receiving node 212. For example, the communication mode detection module 216 could detect the correct communication mode based on the bandwidth of the communication modes, assuming each of the supported communication modes has a unique signal bandwidth.

In this example, the communication mode detection module 216 can cycle through all the supported receiver bandwidth to measure the signal strength. In some implementations, the communication mode detection module 216 cycles through these supported modes from the largest bandwidth to the smallest bandwidth. The communication mode detection module 216 further compares the signal strength, such as the RSSI or an aggregated RSSI, for each bandwidth with the previous bandwidth and determines a reduction of the signal strength (e.g. the signal strength of the previous bandwidth minus the signal strength of the current bandwidth). If the reduction of the signal strength exceeds a threshold value, the communication mode detection module 216 can determine that the previous bandwidth is the correct communication mode. This bandwidth-based mode detection method has the benefit of a fast signal detection because RSSI measurement can be performed quickly. Other ways of cycling through the supported communication modes to detect the correct communication mode can be utilized.

As discussed above, the receiving node 212 that implements the technology presented herein is also capable of receiving standard 802.15.4 signals. For example, if the standard 802.15.4 signal uses the base mode for communication, the pilot prefix detection module 214 can detect the pilot prefix during the standard 802.15.4 preamble. The communication mode detection module 216 can detect the communication mode and the data packet reception module 218 can receive the remaining portion of the data packet 122 as described above. To facilitate the detection of the pilot prefix, the preamble length of the standard 802.15.4 signal might be increased, but still within the allowances set by the 802.15.4 standard.

Figure 4A:
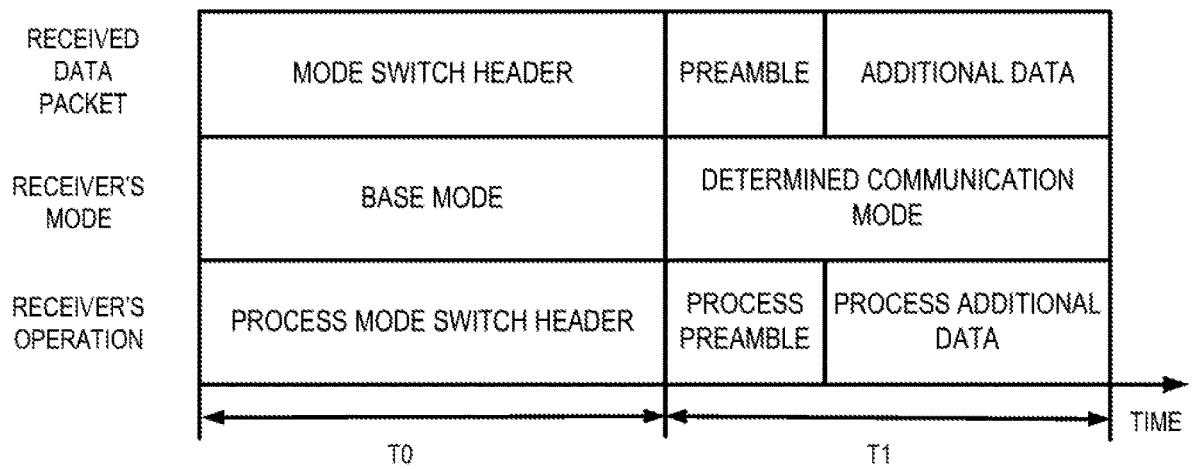
FIG. 4A is a diagram illustrating an example of the data packet received at a receiving node, the mode of the receiving node, and the operations performed by the receiving node, according to a prior art mode switch mechanism.
Figure 4B:
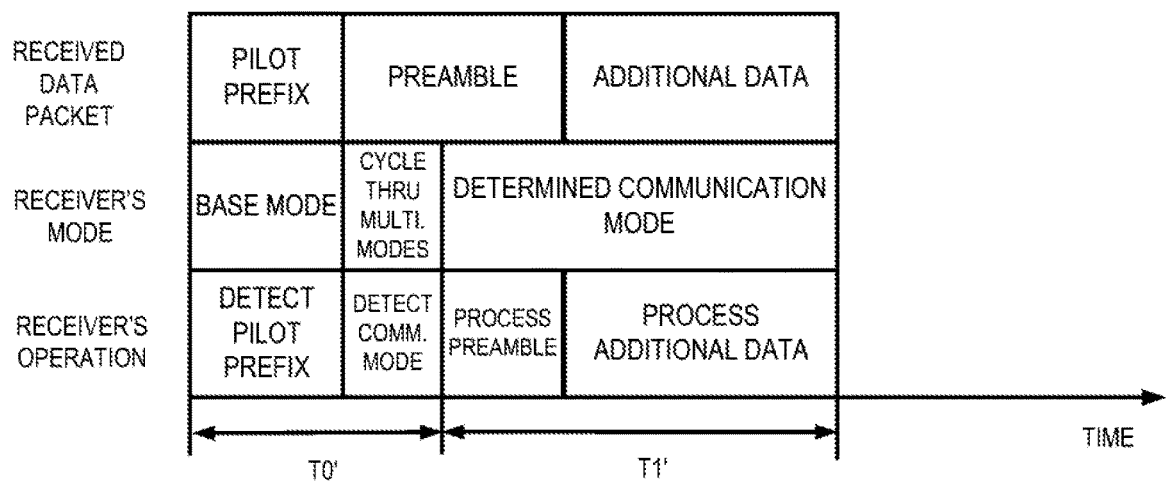
FIG. 4B is a diagram illustrating an example of the data packet received at a receiving node, the mode of the receiving node, and the operations performed by the receiving node, according to certain examples of the disclosure.

Referring now to FIGS. 4A and 4B, where a prior art mode switch mechanism and the mode switch mechanism presented herein are compared. FIG. 4A shows a diagram illustrating an example of the data packet received at a receiving node, the mode of the receiving node, and the operations performed by the receiving node at different time periods, according to a prior art mode switch communication mechanism. FIG. 4B shows the corresponding information for the mode switch mechanism presented herein.

The prior art mode switch mechanism shown in FIG. 4A employs a mode switch header added in each data packet to communicate the communication mode selected by a transmitting node. As such, during the overhead time period T0 when the communication mode is detected, the receiving node in the prior art receives the mode switch header by operating in the base mode and then processes the mode switch header to find out the communication mode used by the transmitting node. After the communication mode is determined, the receiving node switches to the determined communication mode to receive and process the preamble, and then receive and process the rest of the data in the data packet. The receiving node returns to the base mode after this communication.

In comparison, a receiving node 212 implementing the mode switch mechanism presented herein receives a pilot prefix when operating in the base mode. The receiving node 212 detects the existence of the pilot prefix during this time period. After the pilot prefix is detected, the receiving node 212 starts to receive the preamble by cycling through the supported communication modes in the descending order of their data rates to determine the correct mode as described above. This process continues until one of the communication modes is determined to be the correct communication mode. As such, the overhead time period T0' utilized to determine the correct communication mode includes the time period for detecting the pilot prefix and the time period for cycling through the multiple communication modes to determine the correct communication mode. After the correct communication mode is determined, the receiving node 212 continue to receive and process preamble signals in the determined communication mode and then receive and process the remaining data in the data packet.

By utilizing a receiving node 212 with proper hardware configurations, the overhead time period T0' can be significantly smaller than the overhead time period T0 of the prior art. For example, if the base mode of the nodes is set to 2-FSK 10 kbps, the overhead time period T0 of the prior art can be as high as 9.5 milliseconds. The overhead time period T0' of the mode switch mechanism presented here, on the other hand, can be as low as 120 μs if proper hardware configurations, such as the proper sampling rate, are employed at the receiving node. As a result, the communication efficiency can be significantly improved by the techniques proposed herein.

Figure 5:
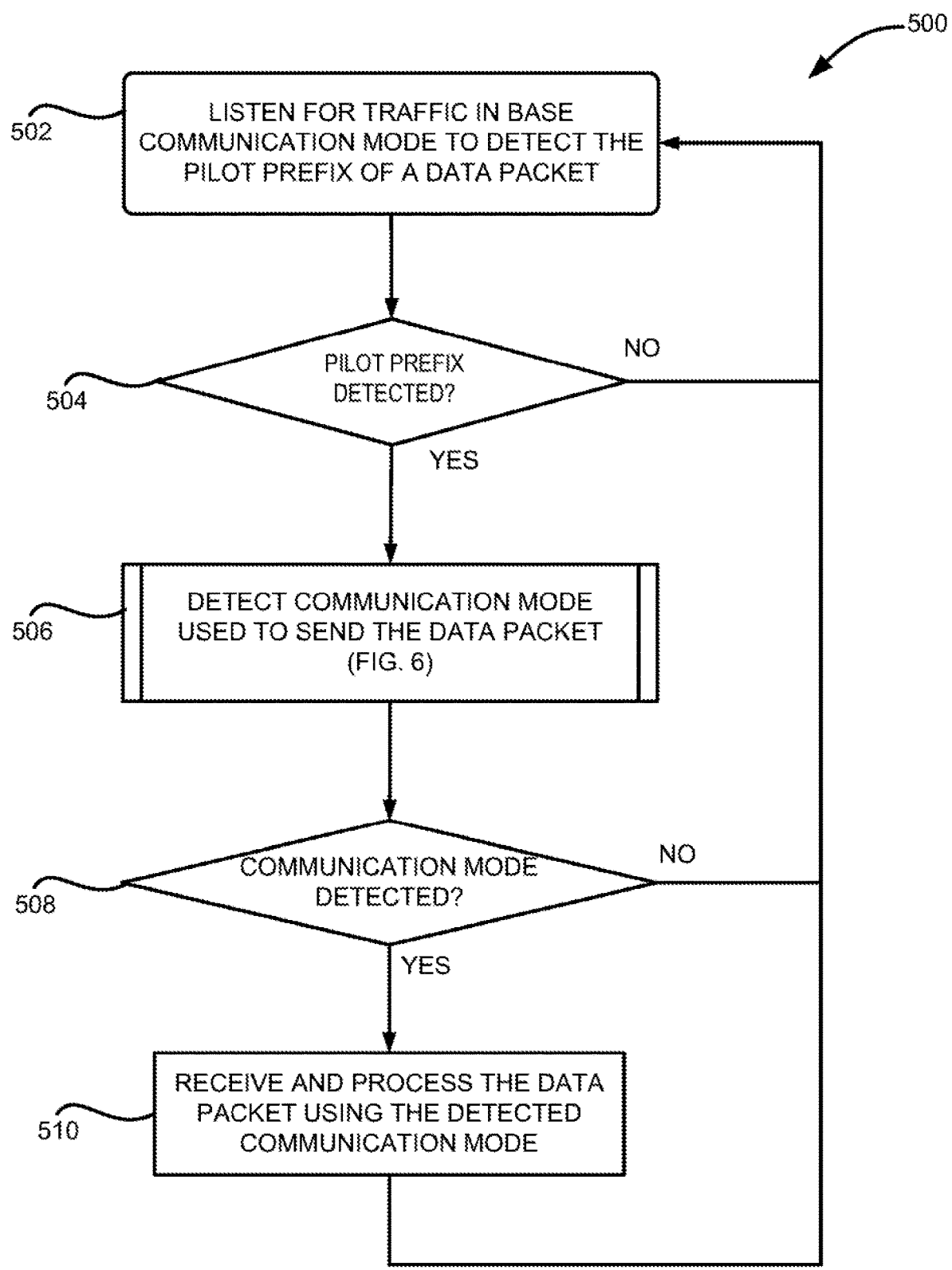
FIG. 5 is an example of a process for receiving and processing data packets transmitted by a transmitting node, according to certain examples of the disclosure.

FIG. 5 is an example of a process 500 for receiving and processing data packets transmitted by a transmitting node, according to certain examples of the disclosure. One or more nodes of the network 100 (e.g., the node 112 or the root node 114) implement operations depicted in FIG. 5 by executing suitable program code. For illustrative purposes, the process 500 is described with reference to certain examples depicted in the figures. Other implementations, however, are possible.

At block 502, the process 500 involves the receiving node 212 listening for incoming traffic in a base communication mode to detect a pilot prefix of a data packet in the received traffic. As described above in detail with regard to FIGS. 1 and 2, the receiving node 212 operates in a base mode that has a long communication range and thus a narrow bandwidth. The receiving node 212 detects the pilot prefix based on the signal strength received at the frequency of the pilot prefix. For instance, the receiving node 212 receives sampled energy of the received signals from the transceiver of the receiving node 212, which are averaged and further processed to determine signal strength indicators such as the RSSI. The receiving node 212 may aggregate, such as taking a weighted or unweighted average of, the signal strength indicators determined over time and compare the aggregated signal strength indicator with a threshold value of pilot prefix strength. If the aggregated signal strength indicator is higher than the threshold value, the receiving node 212 may determine that the pilot prefix is detected; otherwise, no pilot prefix is detected. The receiving node 212 may use other methods to detect the pilot prefix based on the signal strength indicators, such as by comparing each signal strength indicator with the threshold value and performing a majority voting.

Figure 6:
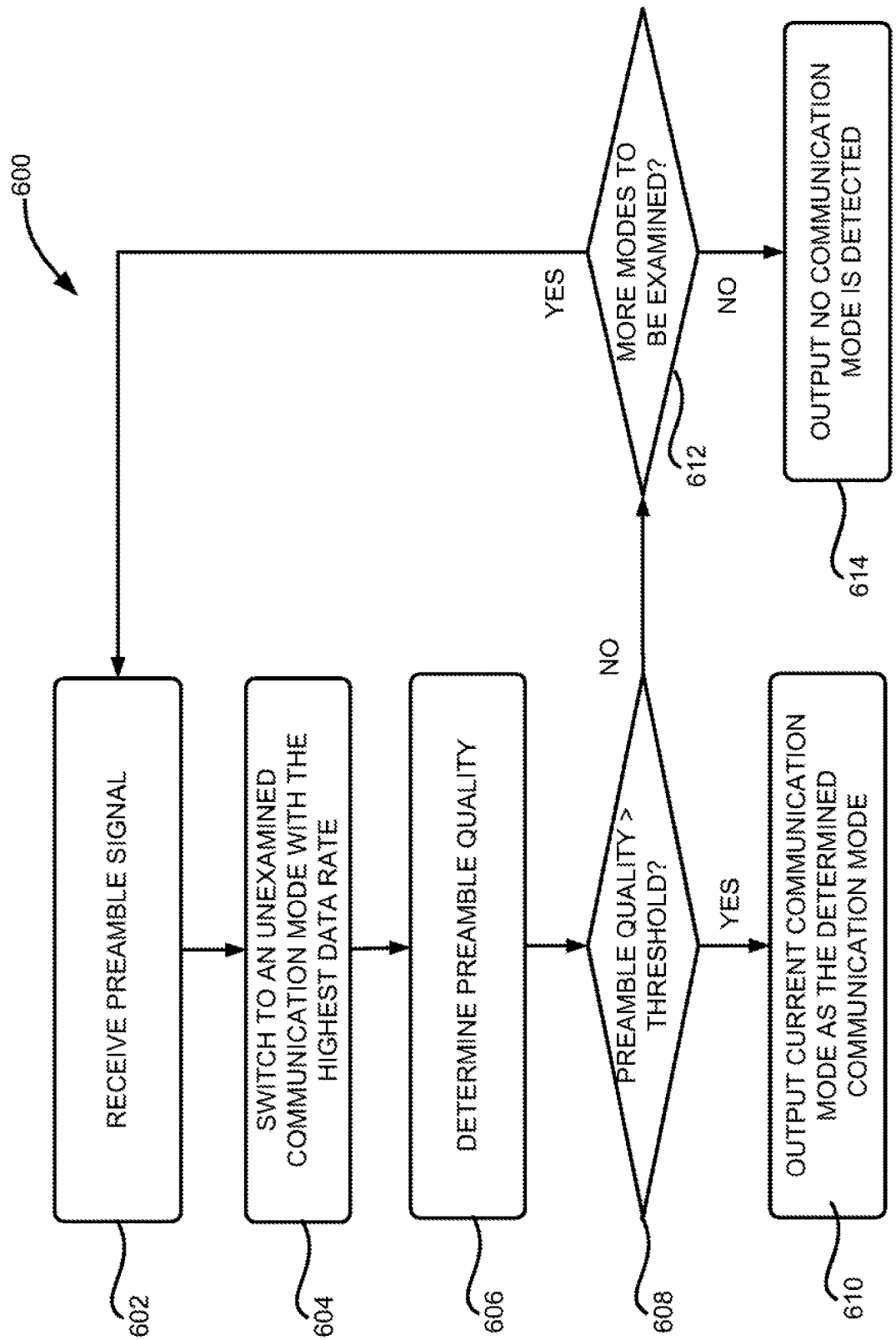
FIG. 6 is an example of a process for detecting a communication mode used by a transmitting mode based on preamble signals in the received data packet, according to certain examples of the disclosure.

At block 504, the process 500 involves determining if the pilot prefix is detected. If the receiving node 212 determines that the pilot prefix is not detected based on the results of block 502, the process 500 proceeds to block 502 to listen for more incoming traffic. If the receiving node 212 determines that a pilot prefix of a data packet is detected based on the results of block 502, the process 500 proceeds to block 506, where the receiving node 212 determines the communication mode utilized by the transmitting node 202 to transmit the remaining portion of the data packet 122. As described above in detail with regard to FIG. 2, in some examples, the receiving node 212 determines the correct communication mode based on the quality of the received preamble signals. In other examples, the receiving node 212 determines the correct communication mode based on the bandwidth of the supported communication modes and the bandwidth of the preamble. FIG. 6 shows an example of a process for detecting a communication mode selected by the transmitting mode based on the quality of the preamble signals in the received data packet.

At block 508, the receiving node 212 determines if the correct communication mode is detected based on the results of block 506. If so, the process 500 proceeds to block 510, where the receiving node 212 receives and processes the remaining portion of the data packet using the detected communication mode. If it is determined at block 508 that the correct communication mode is not detected, the process 500 proceeds to block 502 where the receiving node 212 switches back to the base mode to receive more network traffic and detect the pilot prefix in another data packet.

Turning now to FIG. 6, an example of a process 600 for detecting a communication mode utilized by the transmitting mode based on the quality of preamble signals in the received data packet is presented. At block 602, the process 600 involves receiving preamble signals of the data packet 122. At block 604, the receiving node 212 selects and switches to an unexamined communication mode supported by the receiving node 212 that has the highest data rate. At block 606, the receiving node 212 determines the preamble quality based on the selected mode. As discussed above in detail with regard to FIG. 2, the receiving node 212 may determine the preamble quality by demodulating the received signal and correlating the demodulated signal to the expected preamble signal in the current communication mode.

At block 608, the receiving node 212 compares the determined preamble quality with a threshold value of preamble quality. If the determined preamble quality is higher than the threshold value, the process 600 proceeds to block 610, where the receiving node 212 outputs the current communication mode as the correct communication mode. If the determined preamble quality is not higher than the threshold value, the process 600 proceeds to block 612, where the receiving node 212 determines if there are more communication modes to be examined. If so, the process 600 proceeds to block 602 where more preamble signals are received and utilized to determine the communication mode as described above with respect to blocks 604-608. If it is determined at block 612 that all the supported communication modes have been examined, the process 600 proceeds to operation 614 where the receiving node 212 outputs that no communication mode is detected.

Exemplary Node

Figure 7:
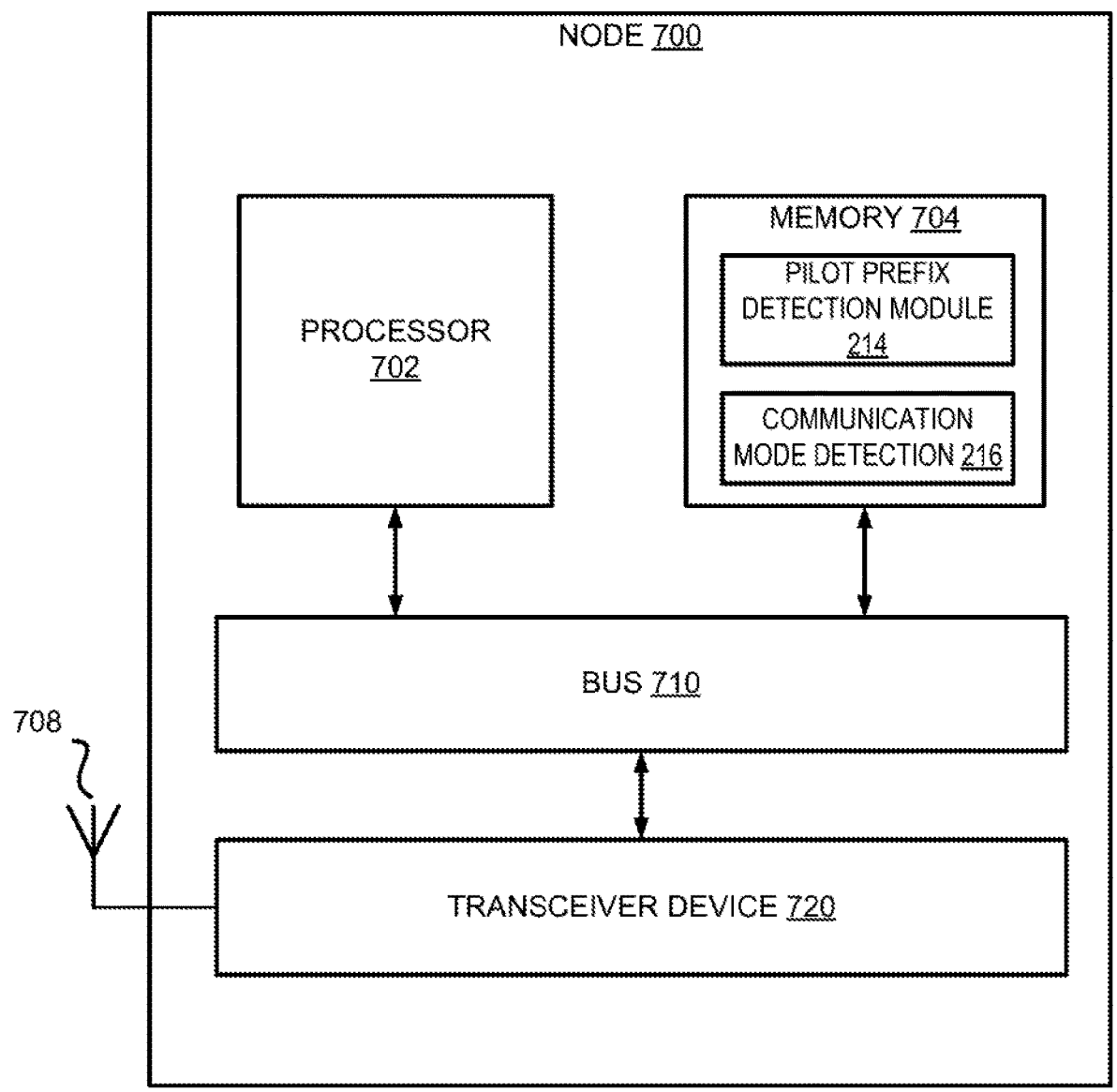
FIG. 7 is a block diagram depicting an example of a computing system suitable for implementing aspects of the techniques and technologies presented herein.

FIG. 7 illustrates an exemplary node 700 that can be employed to implement the mode switch mechanism described herein, such as a node 112 or a root node 114. The node 700 may include a processor 702, memory 704, and a transceiver device 720 each communicatively coupled via a bus 710. The components of node 700 can be powered by an A/C power supply or a low energy source, such as a battery (not shown). The transceiver device 720 can include (or be communicatively coupled to) an antenna 708 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 704. The processor 702 can execute computer-executable program instructions or access information stored in memory to perform operations, such as the pilot prefix detection module 214 and the communication mode detection module 216 described herein. The instructions may comprise processor-specific instructions generated by a compiler and/or an interpreter from code written in any suitable computer-programming language. When instructions, such as those provided in the pilot prefix detection module 214 or the communication mode detection module 216, are executed, they may configure the node 700 to perform any of the operations described herein. Although the processor, memory, bus, and transceiver device are depicted in FIG. 7 as separate components in communication with one another, other implementations are possible. The systems and components discussed herein are not limited to any particular hardware architecture or configuration.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system, comprising:
    a transmitting node configured to:
        generate and transmit a data packet to a receiving node using a communication mode selected from a plurality of supported communication modes, the data packet comprising:
            a pilot prefix generated to have a predetermined frequency, and
            a preamble and additional data generated using the selected communication mode; and
    the receiving node configured to:
        operate in a base communication mode, wherein the base communication mode is one of the plurality of supported communication modes;
        while operating in the base communication mode, detect the pilot prefix;
        in response to determining that the pilot prefix is detected, determine the communication mode used to transmit the data packet based on the preamble received after the detected pilot prefix; and
        receive and process a remaining portion of the data packet using the determined communication mode.

2. The system of claim 1, wherein determining the communication mode used to transmit the data packet comprises:
    receiving preamble signals contained in the preamble;
    evaluating the plurality of supported communication modes by cycling through the plurality of supported communication modes according to a descending order of data rates of the plurality of supported communication modes until a quality of the received preamble signals exceeds a threshold value of preamble quality; and
    determining a currently evaluated supported communication mode as the communication mode used to transmit the data packet.

3. The system of claim 1, wherein the pilot prefix is further generated to have a predetermined amplitude and a predetermined length.

4. The system of claim 1, wherein the predetermined frequency of the pilot prefix is a carrier frequency of the transmitting node.

5. The system of claim 1, wherein the base communication mode comprises one of the plurality of supported communication modes that has a longer range of communication than a majority of the plurality of supported communication modes.

6. The system of claim 1, wherein the plurality of supported communication modes comprise one or more FSK communication modes or one or more OFDM communication modes.

7. The system of claim 1, wherein a portion of the data packet that does not include the pilot prefix is generated to conform to 802.15.4 standard.

8. A node of a network, comprising:
    a processor configured to execute computer-readable instructions; and
    a memory configured to store the computer-readable instructions that, when executed by the processor, cause the processor to perform operations comprising:
        operating in a base communication mode, wherein the base communication mode is one of a plurality of supported communication modes;
        while operating in the base communication mode, detecting a pilot prefix of a data packet, wherein the pilot prefix comprises a signal with a predetermined frequency;
        in response to determining that the pilot prefix is detected, determining a communication mode used to transmit the data packet based on preamble signals that are contained in a preamble of the data packet and received after the detected pilot prefix; and
        receiving and processing a remaining portion of the data packet using the determined communication mode.

9. The node of claim 8, wherein determining the communication mode used to transmit the data packet comprises:
    receiving the preamble signals;
    evaluating the plurality of supported communication modes by cycling through the plurality of supported communication modes according to a descending order of data rates of the plurality of supported communication modes until a quality of the received preamble signals exceeds a threshold value of preamble quality; and
    determining a currently evaluated supported communication mode as the communication mode used to transmit the data packet.

10. The node of claim 8, wherein the pilot prefix is further generated with a predetermined amplitude and a predetermined length.

11. The node of claim 8, wherein the predetermined frequency of the pilot prefix is a carrier frequency of the node.

12. The node of claim 8, wherein the base communication mode comprises one of the plurality of supported communication modes that has a longer range of communication than a majority of the plurality of supported communication modes.

13. The node of claim 8, wherein the plurality of supported communication modes comprise one or more FSK communication modes or one or more OFDM communication modes.

14. The node of claim 8, wherein the data packet except for the pilot prefix is generated to conform to 802.15.4 standard.

15. A method, comprising:
operating, by a receiving node in a mesh network, in a base communication mode, wherein the base communication mode is one of a plurality of supported communication modes;
while operating in the base communication mode, detecting a pilot prefix of a data packet, wherein the pilot prefix comprises a signal with a predetermined frequency;
in response to determining that the pilot prefix is detected, determining, by the receiving node, a communication mode used to transmit the data packet based on preamble signals that are contained in a preamble of the data packet and received after the detected pilot prefix; and
receiving and processing, by the receiving node, a remaining portion of the data packet using the determined communication mode.

16. The method of claim 15, wherein determining the communication mode used to transmit the data packet comprises:
receiving the preamble signals;
evaluating the plurality of supported communication modes by cycling through the plurality of supported communication modes according to a descending order of data rates of the plurality of supported communication modes until quality of the received preamble signals exceeds a threshold value of preamble quality; and
determining a currently evaluated supported communication mode as the communication mode used to transmit the data packet.

17. The method of claim 15, wherein the signal in the pilot prefix further has a predetermined amplitude and a predetermined length.

18. The method of claim 15, wherein the predetermined frequency of the pilot prefix is a carrier frequency of the receiving node.

19. The method of claim 15, wherein the base communication mode comprises one of the plurality of supported communication modes that has a longer range of communication than a majority of the plurality of supported communication modes.

20. The method of claim 15, wherein the plurality of supported communication modes comprise one or more FSK communication modes or one or more OFDM communication modes.

* * * * *